July 8, 1958  R. K. PEPPER  2,842,231
BRAKING SYSTEM FOR SEMI-TRAILERS
Filed Dec. 19, 1955  2 Sheets-Sheet 1
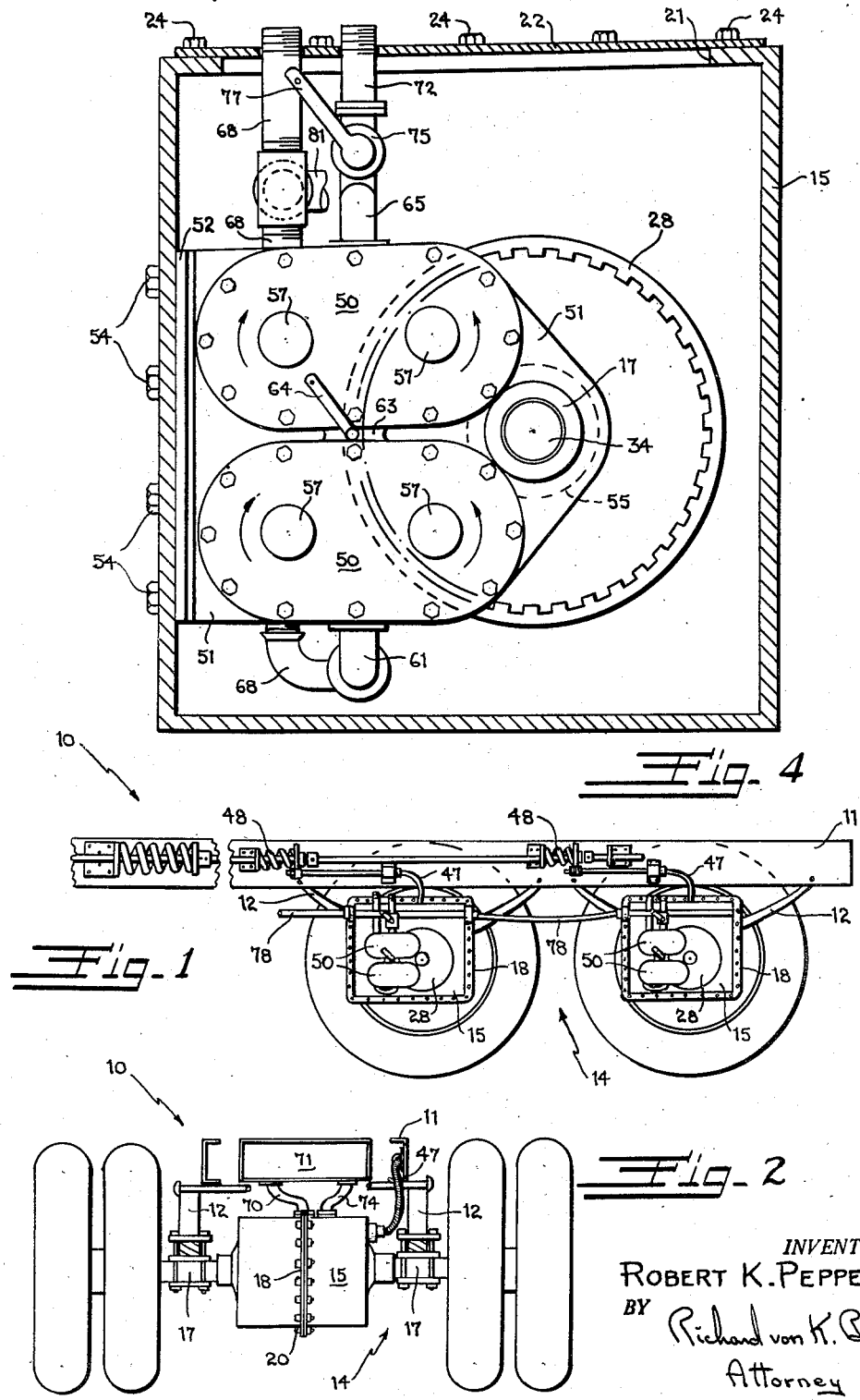
INVENTOR.
ROBERT K. PEPPER
BY Richard von K. Bruns
Attorney

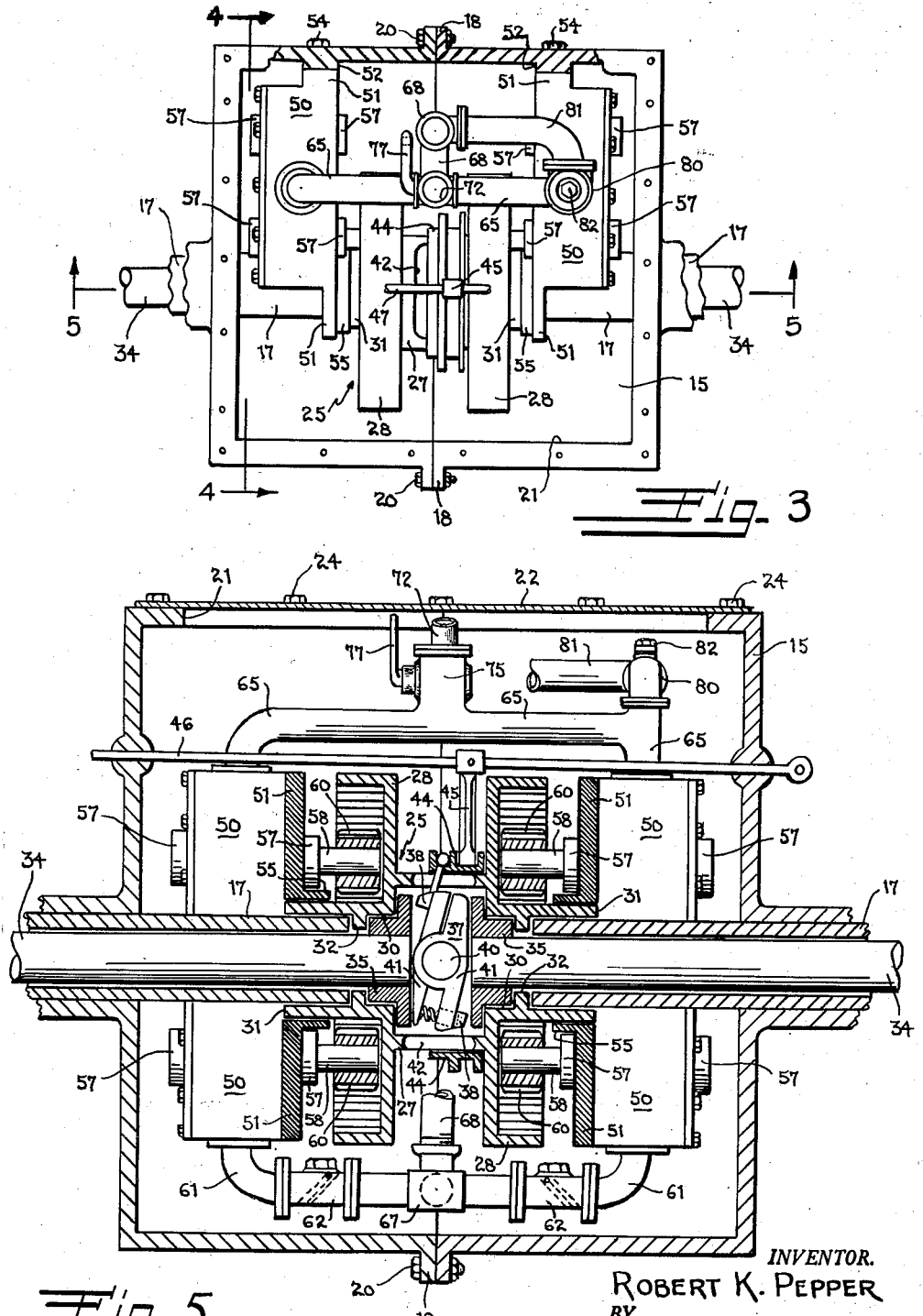

2,842,231

Patented July 8, 1958

2,842,231
BRAKING SYSTEM FOR SEMI-TRAILERS

Robert K. Pepper, Syracuse, N. Y.

Application December 19, 1955, Serial No. 553,803

8 Claims. (Cl. 188—92)

This invention relates generally to speed controls for rotating shafts, and has particular reference to a novel hydrodynamic speed control or braking system for the axle shafts of semi-trailers and the like.

At the present time, more and more freight of all kinds is being transported throughout the country in heavily loaded tractor-trailer combines. In these combines, both the semi-trailers and the tractors are equipped with powerful friction brakes to control the speed of the vehicle. However, in spite of this fact, there has been an increasing number of runaway truck accidents caused by brake failures on long steep downhill grades. These accidents have resulted in serious loss of life and property, and are a source of very great concern to the entire trucking industry.

On long down-grades, pressure must be applied to the brakes almost continuously to maintain control over a heavily loaded tractor-trailer, and this continuous pressure causes the brake drums and linings to get excessively hot and results in scored drums or burned-out linings or both. If the brakes fail in this manner in both the tractor and trailer, the driver is of course left with little control over the vehicle. More often, however, the trailer brakes fail first, which may at least in part be due to the fact that inspections and maintenance are apt to be less frequent on trailers than on tractors.

If the trailer brakes burn out, the tractor must absorb the entire thrust of the trailer on the down-grade and must use gear reduction as well as its brakes to slow the vehicle down. This results in less control over the trailer and increases the danger of side slipping or "jackknifing" as the vehicle travels around curves in the road. Similarly, if the trailer brakes are locked so that the wheels skid, the trailer is apt to swing dangerously on the curves, and even on straight stretches if the road is at all slippery.

In order to eliminate the dangerous situation above referred to and insure complete control over tractor-trailers and like vehicles under all driving conditions, the present invention contemplates the provision of a truly reliable braking system which is adapted to utilize the power generated by the free rotation of the trailer axles to positively control the speed of rotation of the axles. In accordance with the invention, opposite trailer wheels are equipped with free floating axles which may be coupled together to actuate a fluid pumping device having a flow regulating means thereon. Adjustment of the flow regulating means operates through the pumping device to effectively control the axle speed as long as the coupling device remains engaged, while disengagement thereof stops the pumping device and returns the axles to a free floating state. This system is a true fluid braking system employing fluid dynamics to control the axle speed, and is not merely a system of hydraulic push rods for operation of conventional brake bands. It is contemplated, however, that the fluid brake disclosed herein will be used as a safety auxiliary for, or an addition to, the usual friction brakes normally provided.

The applicant is well aware of the fact that a number of fluid brakes have been developed heretofore for use on trucks and passenger vehicles. However, none of these brakes have ever received any widespread use or acceptance in the automotive industry since it has been found that the fluid pumps either wear out or lose their effectiveness due to oil leakage. These disadvantages are chiefly due to the fact that in all of these prior brakes the fluid pump is directly connected to a power driven shaft and therefore is required to operate continuously whenever the vehicle is in motion even though the brake is used but occasionally. This is not the case in the subject invention wherein the free floating axle arrangement permits the fluid pumping device to be completely idle when not needed. In addition, provision is made for a plurality of series and parallel connected pumps which prevents excessive fluid pressures in any single pump and therefore eliminates the primary cause of leakage.

Accordingly, with the foregoing and other considerations in view, it is the primary object of the present invention to provide a truly reliable braking system for tractor-trailer combines which will eliminate most of the serious runaway truck accidents now occurring due to the failure of conventional friction brakes.

Another very important object of the invention is to provide a braking system for tractor-trailers which utilizes existent, unused power generated by the trailer axles to control the rotational speed of the axles.

Another important object of the invention is to provide a braking system for tractor-trailers having a highly effective and efficient fluid pumping device for directly applying the braking action.

Still another important object of the invention is to provide a braking system for tractor-trailers wherein the trailer is equipped with free floating axles and the fluid pumping device is completely idle except when the axles are connected together for rotation as a unit.

A further important object of the invention is to provide a braking system for tractor-trailers wherein the fluid pumping device includes a plurality of series and parallel connected fluid pumps so that fluid leakage is kept to a minimum.

A still further important object of the invention is to provide a tractor-trailer braking system which may be operated by means of conveniently located controls within the cab of the tractor.

Another important object of the invention is to provide a tractor-trailer braking system which will operate automatically under certain emergency conditions.

Still another important object of the invention is to provide a braking system for tractor-trailers which requires practically no upkeep but may be easily disassembled and reassembled for maintenance and repair if necessary.

A still further important object of the invention is to provide a braking system for tractor-trailers which is strong and durable, and is adapted for use on any conventional type of tractor-trailer combine.

Other objects and advantages of the invention will become apparent from the following detailed description thereof read in conjunction with the accompanying drawings which illustrate a typical embodiment of the invention for the purpose of disclosure.

In the drawings:

Figure 1 is a fragmentary side elevation of a semi-trailer chassis incorporating a braking system embodying the invention, certain parts being broken away or shown in section to more clearly illustrate the operation of the actuating mechanism for the system;

Figure 2 is a rear elevation of the semi-trailer chassis shown in Figure 1;

Figure 3 is a top plan view of the braking system housing with the cover plate removed to illustrate the pumping device and associated parts mounted therein;

Figure 4 is a vertical section taken along line 4—4 of Figure 3; and

Figure 5 is a vertical section taken along line 5—5 of Figure 3.

Having reference now to the drawings, wherein like reference numbers designate the same part in each of the views, 10 generally indicates the rear portion of a semi-trailer chassis comprising a frame 11, spring suspension 12 and double wheeled, duel rear axle assembly 14 incorporating the braking system of the invention. The braking system is shown in Figure 1 as applied to a two axled trailer for the purpose of disclosure but it will be understood that it can be used just as well on a single axle trailer, the assembly and operation being the same in both cases. Since the mechanisms on the two axles shown are substantially the same, a detailed description of one will be sufficient for the disclosure.

The braking system includes a housing 15 which is centrally mounted beneath the frame 11 and supported by oppositely disposed axle housings 17, the latter extending into the interior of the housing and terminating adjacent the center thereof as shown in Figure 5. The housing 15 is formed in two sections having mating flanges 18 which are normally secured together as by bolts 20. An access opening 21 is formed in the top of the housing and is normally covered by a cover plate 22 secured to the housing as by bolts 24.

Rotatably mounted on the inner ends of the axle housings 17, within the housing 15, is a gear unit 25 which is formed with a hollow, cylindrical central portion 27 and a pair of larger, outwardly facing internal ring gear portions 28 integrally connected to the central portion and having center openings or bores 30 communicating with the interior thereof. The main planes of the internal ring gear portions 28 are perpendicular to the axis of the axle housings 17, and the bore 30 in each internal ring gear is encircled by an outwardly projecting annular flange or collar 31, which collars receive the inner ends of the axle housings with a loose fit for rotation of the gear unit thereon. An annular shoulder 32 is formed in the inside of each collar 31 to serve as a stop or positioner for the axle housings when the mechanism is being assembled.

In accordance with the invention, the conventional trailer axle assembly is replaced by the axle housings 17 and a pair of axle shafts 34, Figure 5, of the type used in the rear axle of a tractor or truck. Shafts 34 extend through the axle housings 17 and terminate inside the central portion 27 of the gear unit 25 where female coupling members 35 are splined, keyed, or otherwise fixed to the ends thereof. The female coupling members and a rockably mounted male coupling unit 37 are part of a shaft coupling device disclosed and claimed in copending application Ser. No. 520,500, filed July 7, 1955, by the applicant herein, now Patent No. 2,758,688. Accordingly, these components of the device will be but briefly described in this application, reference being made to said copending application for a detailed description thereof.

The shaft coupling device, which either permits the axle shafts 34 to be free floating axles or locks them together for rotation as a unit, is in the form of a positive or jaw clutch, the female coupling members 35 being formed with square notches (not shown) adapted to receive oppositely disposed dogs 38 on the male coupling unit. The latter is mounted on a stub shaft 40 which is supported at each end in diametrically opposed bores (not shown) in the side wall of the gear unit central portion 27. The male coupling unit is comprised of two separate, independently rockable elements 41, one of which is connected through a side access opening 42 in the wall of the gear unit central portion to a sleeve 44 rotatable with the gear unit but slidable longitudinally relative thereto. Movement of this sleeve to the left as viewed in Figure 5 rocks the male coupling unit so that the dogs 38 snap into engagement with the notches in female coupling members 35 as the latter rotate into alignment therewith. This locks the shafts 34 together, while movement of the sleeve to the right rocks the male unit out of engagement with the female members and returns the shafts to a free-wheeling state. The sleeve 44 is connected through a link 45, rod 46 and flexible cable 47 to a spring loaded operating linkage 48, Figures 1 and 2, which may be actuated by a foot pedal or lever (not shown) in the cab of the tractor as described in copending application Ser. No. 520,500, supra.

Since the stub shaft 40 which supports the male coupling unit is secured to the central portion of the gear unit, rotation of the axle shafts will be transmitted to the gear unit when the shafts are locked together by the coupling unit. As the gear unit rotates, the outwardly facing internal ring gear portions 28 thereof simultaneously drive a plurality of fluid pumps 50 mounted in the housing 15 in confronting relation to the internal ring gears. As best shown in Figure 4, each internal ring gear operates two pumps which are arranged one above the other and are connected together in series. The two pumps driven by each internal ring gear are preferably formed from a single casting having a connecting web 51 between the pumps. At the forward end of the casting this web abuts a machined rib 52 on the housing side wall and is secured thereto as by bolts 54, while at the rear end of the casting the web extends around the gear unit collar 31, Figure 5, the latter passing through a central bore and encircling flange 55 formed in the web.

In each of the pumps 50, the impeller gears (not shown) are arranged in side by side relation and are carried on shafts supported by suitable bearings 57. The rear impeller gear is the drive gear in each case, and its shaft 58 is extended beyond the pump casing and terminates in a pinion 60 in mesh with the internal ring gear 28. The lower pump in each pair takes fluid in through a conduit 61 provided with a suitable check valve 62 to prevent operation of the pumps in the reverse direction. The lower pump discharges the fluid through an interconnecting conduit 63 and suitable control valve 64 to the inlet side of the upper pump which in turn discharges it into a conduit 65. As best shown in Figure 5, the inlet conduits 61 for the two pairs of pumps are joined by a T-connection 67 to a common inlet conduit 68 which extends up through the cover plate 22 where it is connected by a flexible hose 70, Figure 2, to a fluid reservoir 71 mounted on the frame of the trailer.

The outlet conduits 65 for the two pairs of pumps are also yoked together and connect with a common outlet conduit 72 connected to the reservoir by a flexible hose 74, Figures 3 and 2. The two pairs of pumps are thus connected together in parallel, even though the pumps in each pair are series conected. Positioned in the conduit 72 is a control valve 75 having an operating lever 77 which is connected by linkages (not shown) to the operating levers of the control valves 64 for simultaneous actuation therewith. These linkages are connected by a Bowden or speedometer type cable 78, Figure 1, or other suitable linkage, to a foot pedal or lever (not shown) in the cab of the tractor. The valves 64 and 75 control the flow of fluid being discharged by the pumps and may be adjusted to permit a free flow or to retard the flow in any desired amount. When the flow of fluid is retarded a back pressure or resistance is exerted on the pumps which effects a braking action on the gear unit and axle shafts directly connected thereto.

In order to prevent the gear pumps from stopping entirely and locking the trailer wheels when the control valves are closed fully in an emergency application, a suitable safety or overload valve 80 is located in the yoked outlet conduits 65 to take the sudden shock. This overload valve is connected by a bridging conduit 81 to the common inlet conduit 68 as is best shown in Figure 3. Passage of fluid through the bridging conduit is normally prevented by the safety valve, but when the pressure in the pumps becomes too great the valve is forced open allowing the liquid to circulate through the conduit until the pressure diminishes and the valve again closes. The pressure necessary to open the safety valve is preferably just below the pressure at which the pumps and trailer wheels would lock, and may be regulated by the adjustment nut 82 at the top of the valve. With this arrangement, a positive braking action without wheel locking can be exerted on the trailer wheels so that full control is retained over the trailer at all times.

As pointed out hereinabove, the fluid braking system described herein is preferably employed as a "safety" brake or auxiliary to the conventional friction brakes normally provided on the trailer. Thus, the fluid brakes are particularly adapted for use on long steep down-grades, or when the roads are icy, or when the friction brakes are otherwise inadequate for the occasion. For example, when the tractor-trailer is travelling through mountainous country, where the grades are both long and steep and the danger of burned out brake linings is very real, the driver will normally actuate the shaft coupling control at the approach of each down-grade to lock the trailer axle shafts 34 together. This sets the previously idle gear unit and fluid pumps in operation, although the fluid will circulate freely through the latter as long as the control valve 75 remains in fully open position. However, when braking action is desired, the driver will adjust the valve control in his cab to retard the flow of fluid and provide the desired amount of braking force to the trailer wheels. When the tractor-trailer reaches the bottom of the grade, the control valve may be readjusted to fully open position to remove the braking force, and the shaft coupling device may be disengaged to return the axle shafts to a freewheeling state with the gear units and pumps inoperative so that there will be no drag on the shafts due to the operation thereof.

As shown somewhat diagrammatically in Figure 1, the shaft coupling and control valve linkages for the brakes on the two rear axles are interconnected so that both will be controlled in exactly the same manner at the same time. It will be understood, of course, that these linkages can be purely mechanical, or can be operated by suitable air or vacuum controls in the well known manner. Whenever the shaft coupling device is engaged to lock the axle shafts together, the fluid brakes may be used as parking brakes on a hill and will prevent back sliding down the hill. The reason for this is that the check valves 62 positively prevent reverse operation of the pumps and therefore serve to lock the wheels in this direction.

Since the fluid pumps operate only when the axle shafts are locked together, which will be a relatively small percentage of the time under normal driving conditions, the pumps are not subjected to the tremendous wear which rendered the continuous operating pumps of the prior art impractical. Furthermore, the series or tandem arrangement of the pumps in the present invention prevents excessive fluid pressures in any one of the pumps, and therefore removes the chief cause of fluid leakage. In this connection, it should be pointed out that additional pumps can be incorporated in the system by enlarging the housing and locating the additional pumps in the rear half thereof so that their drive pinions engage the right hand side of the internal ring gear as viewed in Figure 4.

From the foregoing description it will be apparent that the invention disclosed herein provides a novel and highly practical fluid braking system for semi-trailers and the like. The system provides an extremely safe and reliable control for the trailer and does so by utilizing available power generated by the trailer itself. With this arrangement, which provides a powerful braking action without wheel locking, the trailer can exert a back drag on the tractor rather than a thrust thereagainst so that proper control can be maintained and the possibility of side slipping or jackknifing is reduced to a minimum.

The invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In a braking system for semi-trailers, a housing, a gear unit rotatably mounted within said housing, a pair of normally independently rotatable axle shafts terminating at their inner ends within said gear unit, a shaft coupling device mounted in said gear unit, means to actuate said coupling device to lock said shafts and gear unit together for rotation as a unit, a fluid reservoir, a plurality of fluid pumps located on each of the two opposite sides of said gear unit, said pumps having common inlet and outlet connections with said reservoir, means operably connecting each of said pumps with said gear unit to simultaneously actuate the pumps when the unit rotates with said shafts, and valve means in said outlet connection to regulate the flow of fluid discharged from said pumps.

2. In a braking system for semi-trailers, a housing, a gear unit rotatably mounted within said housing, said gear unit including a pair of oppositely disposed internal ring gear portions on two opposite sides thereof, a pair of free floating axle shafts terminating at their inner ends in the interior of said gear unit, a shaft coupling device mounted in said gear unit for rotation therewith, means to actuate said coupling device to lock said shafts and gear unit together for rotation as a unit, a pair of interconnected fluid pumps mounted in said housing adjacent said ring gear portions of said gear unit, means operably connecting each of said pumps with said gear unit to drive the pumps when the unit rotates with said shafts, and valve means to control the discharge of fluid from said pumps.

3. In a braking system for semi-trailers, a housing, a gear unit rotatably mounted within said housing, said gear unit having a hollow central portion and a pair of outwardly facing internal ring gear portions on two opposite sides of said central portion, a pair of free floating axle shafts terminating at their inner ends in spaced relation within the hollow central portion of said gear unit, a shaft coupling device mounted in said gear unit between the inner ends of said shafts, means to actuate said coupling device to lock said shafts and gear unit together for rotation as a unit, a pair of interconnected fluid pumps mounted in said housing in confronting relation to each of said outwardly facing internal ring gear portions of the gear unit, the pumps in each of said pairs being connected together in series, gearing connections between said ring gear portions and each of said pumps to drive the pumps when said gear unit rotates with said axle shafts, a fluid reservoir, common inlet and outlet conections between said reservoir and said pumps, and a plurality of control valves to regulate the flow of fluid discharged by said pumps and thereby control the speed of rotation of said axle shafts.

4. Structure as defined in claim 3 together with a check valve on the inlet side of said pumps to permit operation thereof in but one direction only.

5. Structure as defined in claim 3 together with an overload valve on the outlet side of said pumps.

6. In combination with a pair of normally independently rotatable, free wheeling axle shafts for a trailer, normally idle fluid pumping means mounted independently of said axle shafts, a shaft coupling device operable to couple said shafts together for rotation as a unit, means operably connecting said coupling device with said pumping means independently of said shafts, said coupling device being normally disengaged from said shafts to permit free and independent rotation of the shafts relative to the device and pumping means, means to actuate said device to couple said shafts together, said device being rotatable with said shafts when they are coupled together to thereby actuate said pumping means, and valve means to control the flow of fluid pumped by said pumping means.

7. In a braking system for semi-trailers, a housing, a hollow gear unit rotatably mounted within said housing, a pair of free floating axle shafts terminating at their inner ends within said hollow gear unit, a shaft coupling device mounted in said hollow gear unit and rotatable therewith, said coupling device being located intermediate the inner ends of said shafts and being normally out of engagement therewith, means to actuate said coupling device to lock said shafts and gear unit together for rotation as a unit, a fluid reservoir, fluid pumping means having inlet and outlet connections wth said reservoir, means operably connecting said pumping means with said gear unit to actuate the pumping means when the unit rotates with said shafts, and valve means in said outlet connection to regulate the flow of fluid discharged from said pumps.

8. In the trailer of a tractor-trailer vehicle combine, said trailer having a pair of free wheeling axle shafts for opposite rear wheels thereof, a housing, a gear unit rotatably mounted within said housing, said axle shafts terminating at their inner, free ends within said hollow gear unit, a pair of female coupling members respectively secured to the inner ends of said axle shafts in spaced relation to one another, a male coupling member mounted in said hollow gear unit and rotatable therewith, said male coupling member being located intermediate said female coupling members and being normally out of engagement therewith, means to actuate said male coupling member to lock said axle shafts and gear unit together for rotation as a unit, a fluid reservoir, fluid pumping means mounted independently of said axle shafts and having inlet and outlet connections with said reservoir, means operably connecting said pumping means with said hollow gear unit independently of said axle shafts to actuate the pumping means when the unit rotates with said shafts, and valve means in said outlet connection to regulate the flow of fluid discharged from said pumps.

References Cited in the file of this patent

UNITED STATES PATENTS

| 1,338,302 | Hultenheim | Apr. 27, 1920 |
| 1,635,383 | Nettenstrom | July 12, 1927 |
| 1,669,325 | Buckley | May 8, 1928 |
| 2,179,540 | Burdick | Nov. 14, 1939 |

FOREIGN PATENTS

| 485,065 | Great Britain | May 13, 1938 |
| 909,346 | France | Dec. 20, 1945 |